① United States Patent  (10) Patent No.: US 9,158,107 B2
Fujitsuka et al.  (45) Date of Patent: Oct. 13, 2015

(54) SEMICONDUCTOR DEVICE

(71) Applicant: KABUSHIKI KAISHA TOYOTA CHUO KENKYUSHO, Nagakute-shi, Aichi-ken (JP)

(72) Inventors: Norio Fujitsuka, Nisshin (JP); Takashi Ozaki, Nagakute (JP); Keiichi Shimaoka, Nagoya (JP); Yutaka Nonomura, Nagoya (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 456 days.

(21) Appl. No.: 13/626,600

(22) Filed: Sep. 25, 2012

(65) Prior Publication Data

US 2013/0100515 A1 Apr. 25, 2013

(30) Foreign Application Priority Data

Oct. 21, 2011 (JP) ................................. 2011-232190
Apr. 20, 2012 (JP) ................................. 2012-097066

(51) Int. Cl.
*G02B 26/08* (2006.01)

(52) U.S. Cl.
CPC .................................. *G02B 26/0841* (2013.01)

(58) Field of Classification Search
CPC ............. G02B 26/0841; G02B 26/105; G02B 26/0833
See application file for complete search history.

(56) References Cited

U.S. PATENT DOCUMENTS

| 7,050,211 B2 * | 5/2006 | Orcutt ........................ 359/224.1 |
| 2004/0023429 A1 | 2/2004 | Foerstner et al. |
| 2006/0066936 A1 | 3/2006 | Chui et al. |
| 2007/0284680 A1 | 12/2007 | Hashimura et al. |
| 2008/0100899 A1 | 5/2008 | Shimokawa et al. |
| 2009/0021884 A1 | 1/2009 | Nakamura |

FOREIGN PATENT DOCUMENTS

| JP | S551880 U1 | 1/1980 |
| JP | A-2000-147419 | 5/2000 |
| JP | A-2001-249300 | 9/2001 |
| JP | A-2002-365583 | 12/2002 |
| JP | A-2004-325578 | 11/2004 |
| JP | A-2005-534510 | 11/2005 |
| JP | A-2007-312373 | 11/2007 |
| JP | A-2008-514995 | 5/2008 |
| JP | A-2009-208164 | 9/2009 |
| JP | A-2009-281845 | 12/2009 |

(Continued)

OTHER PUBLICATIONS

Office Action issued in Japanese Application No. 2012-097066 mailed on Apr. 8, 2014 (with translation).

(Continued)

*Primary Examiner* — Jennifer L. Doak
(74) *Attorney, Agent, or Firm* — Oliff PLC

(57) ABSTRACT

Provided is technique for a semiconductor device including a substrate and a tilting plate which is tiltable relatively to the substrate, the technique being capable of effectively suppressing warpage of the tilting plate. The semiconductor device of the present specification includes a substrate and a tilting plate which is tiltable relatively to the substrate. In the semiconductor device, a rib formed of wavelike portions where a plate thickness is substantially uniform is formed on the tilting plate.

10 Claims, 14 Drawing Sheets

(56) References Cited

FOREIGN PATENT DOCUMENTS

| | | |
|---|---|---|
| JP | A-2010-44410 | 2/2010 |
| JP | A-2010-54944 | 3/2010 |
| JP | A-2010-223850 | 10/2010 |
| JP | A-2010-228029 | 10/2010 |
| JP | A-2010-243420 | 10/2010 |
| JP | A-2011-100103 | 5/2011 |
| JP | A-2011-123363 | 6/2011 |
| JP | A-2011-215312 | 10/2011 |
| JP | A-2012-097066 | 4/2014 |
| WO | WO 2007/110928 A1 | 10/2007 |

OTHER PUBLICATIONS

Yamasaki et al., "A Level Set Method-based Topology Optimization Method Using the Discretization-based Sensitivity with Respect to the Signed Distance Function", Transactions of JSCES, Paper No. 20090012, 2009, pp. 1-9, Japan Society for Computational Engineering and Science, Japan (with English abstract).

Ozaki et al., "Micromirror Based on SiO2-covered Polysilicon Structure for Cmos Integration", Ieej Sensors and Micromachine Society, the 28th Sensor Symposium on Sensors, Micromachines and Application Systems, 2011, pp. 111-116 (with English abstract).

Nov. 4, 2014 Office Action issued in Japanese Application No. 2012097066.

\* cited by examiner

US 9,158,107 B2

SEMICONDUCTOR DEVICE

CROSS-REFERENCE TO RELATED APPLICATIONS

This application claims priority to Japanese Patent Application No. 2011-232190 filed on Oct. 21, 2011, and Japanese Patent Application No. 2012-097066 filed on Apr. 20, 2012, the contents of which are hereby incorporated by reference into the present application.

TECHNICAL FIELD

The present application relates to a semiconductor device.

DESCRIPTION OF RELATED ART

Semiconductor devices including a substrate and a tilting plate which is tiltable relatively to the substrate have been known. These semiconductor devices are applied to, for example, an optical deflection device. In such a type of the optical deflection device, a mirror is fixed on the tilting plate, and an angle of the mirror is adjusted by tilting the tilting plate with respect to the substrate.

In the above semiconductor device, if warpage occurs in the tilting plate, the angle of the mirror fixed on the tilting plate becomes different from the desired angle. Therefore, techniques for suppressing the warpage of the tilting plate have been developed in the related art. In a technique disclosed in Japanese Patent Application Publication No. 2004-325578, a convex shaped rib is disposed on a rear surface of a tilting plate so as to increase a stiffness of the tilting plate, so that the warpage of the tilting plate is suppressed.

SUMMARY OF INVENTION

The present application discloses a plate-shaped member formed by using a semiconductor process and having a planar expansion. The plate-shaped member includes first and second areas of which positions are different in a plate thickness direction. A thickness of the plate-shaped member in the first area is substantially equal to a thickness of the plate-shaped member in the second area. The present application also discloses a semiconductor device. The semiconductor device comprises a substrate and a tilting plate which is tiltable relatively to the substrate. The tilting plate includes first and second areas of which positions are different in a plate thickness direction. A thickness of the tilting plate in the first area is substantially equal to a thickness of the tilting plate in the second area.

The present application also discloses another semiconductor device. The semiconductor device comprises a substrate; and a tilting plate which is tiltable relatively to the substrate. The tilting plate includes a rib configured to relieve influence of remaining stress in a plate thickness direction. A thickness of the rib is substantially equal to a thickness of the tilting plate.

DETAILED DESCRIPTION OF INVENTION

Figure 1:
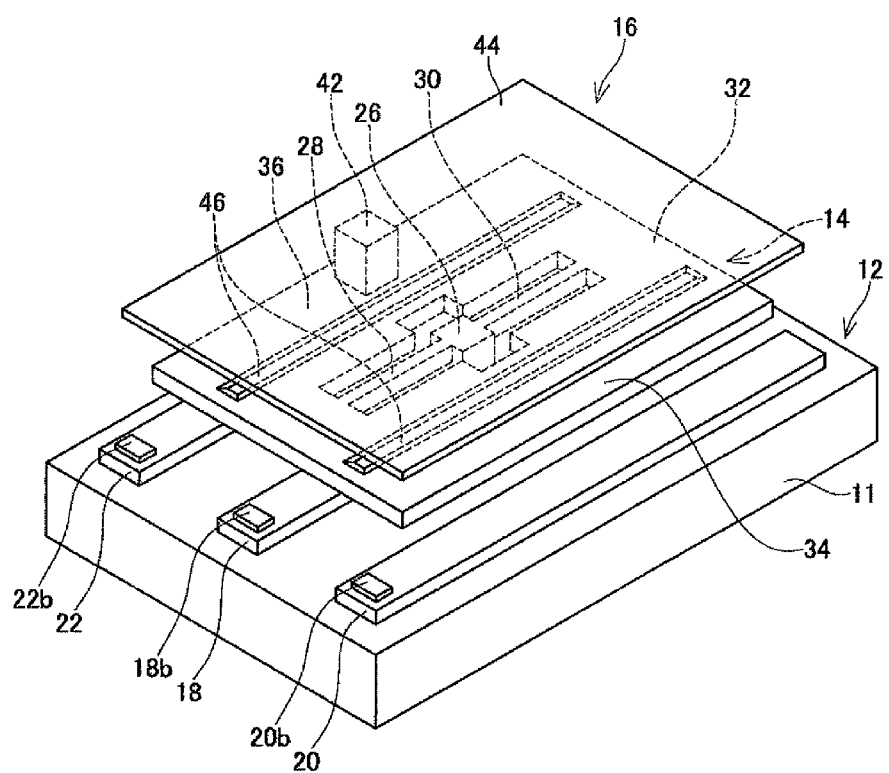
FIG. 1 is a schematic perspective diagram illustrating a configuration of an optical deflection device 10.

As in the case of the convex-shaped rib in Japanese Patent Application Publication No. 2004-325578, if a rib having a shape where an inner portion thereof is buried is formed on the tilting plate, the thickness of the tilting plate is largely different between the site where the rib is not formed and the site where the rib is formed. As a result, unbalance of remaining stress in the plate thickness direction occurs, thereby causing warpage in the tilting plate. There is a problem in that the warpage occurs in the tilting plate due to the rib, which is formed on the tilting plate with the purpose of suppressing the warpage of the tilting plate.

Herein, a technique is provided to solve the above problem. Herein, there is provided a technique for a semiconductor device including a substrate and a tilting plate which is tiltable relatively to the substrate, the technique being capable of effectively suppressing warpage of the tilting plate.

The semiconductor device disclosed herein includes a substrate and a tilting plate which is tillable relatively to the substrate. In the semiconductor device, a rib formed of wave-like portions where a plate thickness is substantially uniform is formed on the tilting plate.

In the above semiconductor device, the rib formed on the tilting plate has a shape where an inner portion thereof is not buried unlike Japanese Patent Application Publication No. 2004-325578 where the inner portion thereof is buried. Therefore, the plate thickness may be configured to be substantially equal between the site where the rib is formed and the site where the rib is not formed. Accordingly, it is possible to suppress the warpage of the tilting plate caused by unbalance of the remaining stress in the plate thickness direction.

In addition, in the above semiconductor device, even in the case where the tilting plate is tilted so that the rib collides with the substrate, stress is not easily concentrated on a portion of the rib, and the rib is not easily damaged. It is possible to further improve reliability of the semiconductor device.

In addition, in the above semiconductor device, the rib formed on the tilting plate has functions of absorbing deformation against a force of deforming the tilting plate and maintaining the tilting plate in an overall planar shape. Since the rib having the above configuration is formed on the tilting plate, it is possible to effectively suppress occurrence of the warpage of the tilting plate.

In the above semiconductor device, it is preferable that a inclined portion be formed on a side wall of a rib.

In many cases, a conductive layer is formed in the tilting plate. After a polysilicon layer is laminated, the polysilicon layer is allowed to have conductivity by performing ion injection and impurity diffusion, so that the conductive layer is formed. If a vertical portion is formed on the side wall of the rib, since the thickness is different only in the vertical portion, ion injection may not be implemented in the lower portion of the vertical portion, so that it is difficult to obtain uniform conductivity. Like the above semiconductor device, in the case where the inclined portion is formed on the side wall of the rib, it is easy to uniformly inject ions into the inclined portion. It is possible to allow the conductive layer formed on the tilting plate to have uniform conductivity.

In the above semiconductor device, it is preferable that the tilting plate include a conductive layer and an insulating film which covers a periphery of the conductive layer.

Since the periphery of the conductive layer of the tilting plate is covered with the insulating film, the tilting plate is formed of a three-layer structure, so that it is possible to further improve the strength and stiffness of the tilting plate. In addition, since the periphery of the conductive layer is covered with the insulating film which is chemically stable, it is possible to suppress change in quality due to oxidation or the like of the conductive layer.

It is preferable that the above semiconductor device further include a mirror fixed on the tilting plate.

Since the mirror fixed on the tilting plate is disposed, the above semiconductor device may be used as optical deflection device having a high aperture ratio. In the above semiconductor device, since the warpage of the tilting plate is suppressed, it is possible to appropriately adjust the angle of the mirror. In addition, since a gap between the tilting plate and the substrate can be formed with high accuracy, it is possible to implement a driving voltage as it is designed during the design period. In the case where a plurality of optical deflection devices is used in an array shape, it is possible to reduce variation in characteristics of the optical deflection devices.

In the above semiconductor device, it is preferable that the shape of the rib of the tilting plate be determined by using a structure optimization method for minimizing an amount of deformation of the tilting plate with respect to internal stress.

Although the rib formed on the tilting plate may be formed in various shapes, it is not easy for a designer to consider the shape of the rib for allowing the tilting plate to have the highest stiffness. According to the above semiconductor device, since the structure optimization method for minimizing an amount of deformation of the tilting plate with respect to the internal stress is used, it is possible to implement the shape of the rib for allowing the tilting plate to have the highest stiffness.

According to the technique disclosed herein, in a semiconductor device including a substrate and a tilting plate which is tiltable relatively to the substrate, it is possible to effectively suppress warpage of the tilting plate.

Features of an exemplary embodiment will be listed.

(Feature 1) A fixed electrode is formed on the substrate, and a movable electrode is formed on the tilting plate.

(Feature 2) The tilting plate is tiltably supported by a supporting column and supporting beams in a state where the tilting plate is floating above the substrate.

Embodiment

Hereinafter, an optical deflection device 10 which is an embodiment of a semiconductor device will be described with reference to FIGS. 1 to 4. The optical deflection device 10 includes a substrate 12, a movable structure 14, and a mirror structure 16. As described later, the optical deflection device 10 is manufactured by using a semiconductor manufacturing process.

The substrate 12 is formed on a silicon wafer 11. The substrate 12 includes a relay electrode portion 18 and a pair of fixed electrode portions 20 and 22. The relay electrode portion 18 is formed on an upper surface of the substrate 12 and is extended from a center of the substrate 12 to end portions thereof. The fixed electrode portions 20 and 22 are formed on the upper surface of the substrate 12 and are disposed at symmetric positions interposing the relay electrode portion 18 therebetween. The relay electrode portion 18 includes a relay electrode 18a of which periphery is covered with an insulating film 24. The fixed electrode portion 20 includes a fixed electrode 20a of which periphery is covered with the insulating film 24. The fixed electrode portion 22 includes a fixed electrode 22a of which periphery is covered with the insulating film 24. The fixed electrodes 20a and 22a are formed so as to have a shape of a rectangle as the substrate 12 is seen from the upper side in a plan view. The relay electrode 18a and the fixed electrodes 20a and 22a are made of a polysilicon having conductivity. The insulating film 24 is made of a silicon oxide. The relay electrode 18a and the fixed electrodes 20a and 22a are insulated from each other. The relay electrode 18a is conductively connected to a movable electrode terminal 18b which is exposed on the upper surface of the substrate 12. The fixed electrode 20a is conductively connected to a fixed electrode terminal 20b which is exposed on the upper surface of the substrate 12. The fixed electrode 22a is conductively connected to a fixed electrode terminal 22b which is exposed on the upper surface of the substrate 12.

Figure 3:
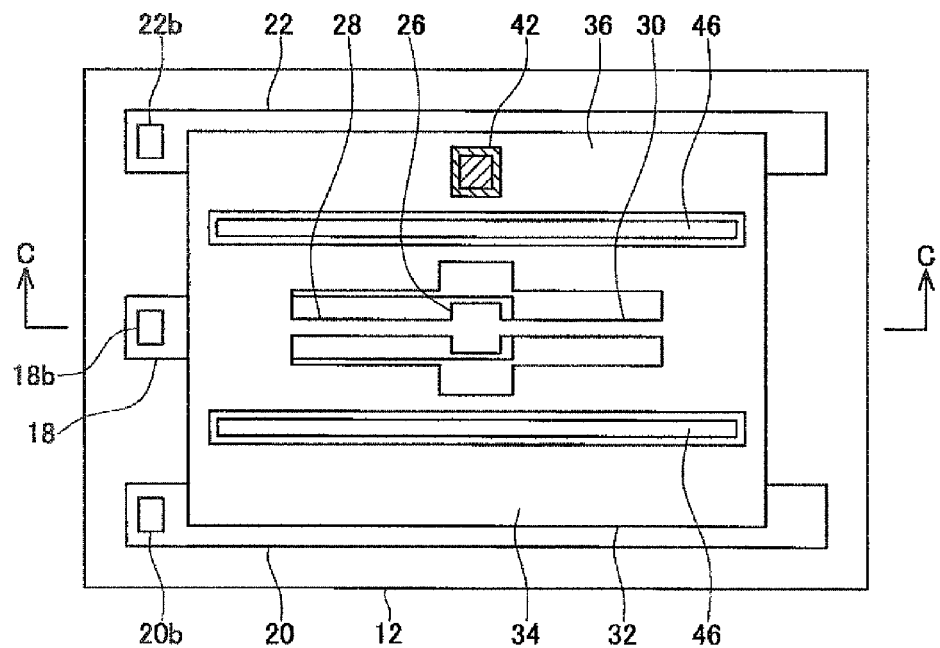
FIG. 3 is a cross-sectional diagram of the optical deflection device 10 taken along line B-B of FIG. 2.

As illustrated in FIG. 3, the movable structure 14 includes a supporting column 26, a pair of supporting beams 28 and 30, and a tilting plate 32. The tilting plate 32 is formed so as to have a shape of a rectangle having an opening at the center as the movable structure 14 is seen from the upper side in a plan view. Movable electrode portions 34 and 36 are formed in the long side portions of the tilting plate 32. In the tilting plate 32, the one movable electrode portion 34 is disposed to face the fixed electrode portion 20, and the other movable electrode portion 36 is disposed to face the fixed electrode portion 22. The supporting column 26 is extended from an end portion of the relay electrode portion 18 which is located at the center of the substrate 12 upwards and reaches the opening which is located at the center of the tilting plate 32. The supporting beams 28 and 30 are configured to connect the upper end of the supporting column 26 and the tilting plate 32. The supporting beams 28 and 30 are disposed at symmetric positions interposing the supporting column 26 therebetween. The tilting plate 32 is supported by the supporting column 26 and the supporting beams 28 and 30 in a state where the tilting plate 32 is floating above the substrate 12.

The supporting beams 28 and 30 are formed in a slender shape. If a torque around a tilting axis X (refer to FIG. 3) in the direction along the supporting beams 28 and 30 is exerted to the tilting plate 32, the supporting beams 28 and 30 supporting the tilting plate 32 are torsionally deformed, so that the tilting plate 32 is tilted around the tilting axis X.

Figure 2:
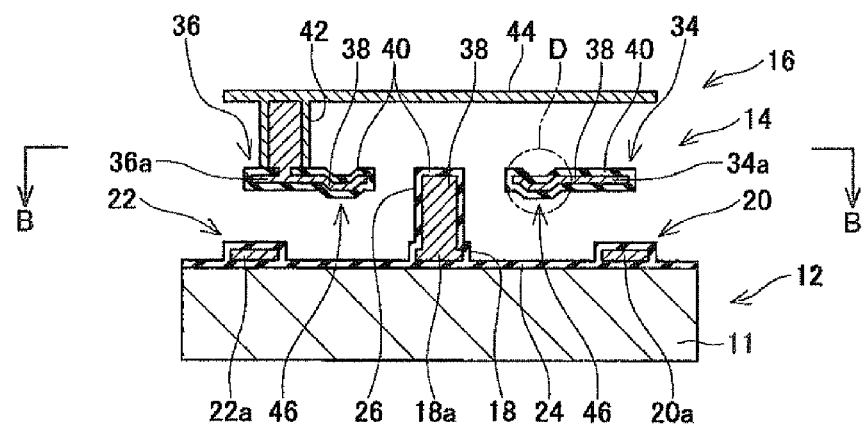
FIG. 2 is a cross-sectional diagram illustrating the optical deflection device 10.
Figure 4:
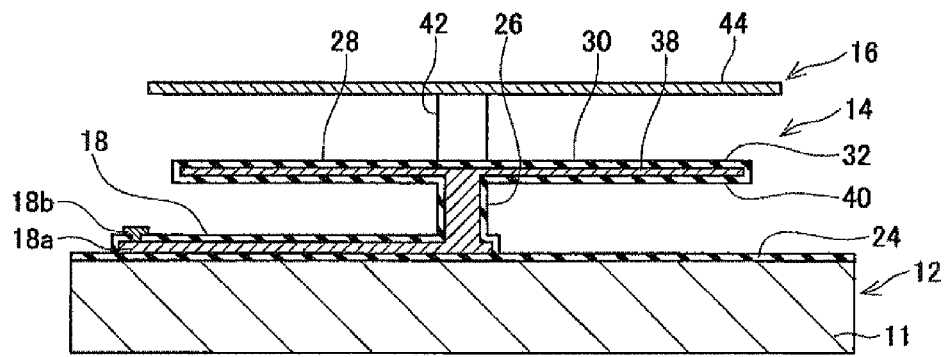
FIG. 4 is a cross-sectional diagram of the optical deflection device 10 taken along line C-C of FIG. 3.

As illustrated in FIGS. 2 and 4, any one of the supporting column 26, the supporting beams 28 and 30, and the tilting plate 32 includes a conductive layer 38 and an insulating film 40 covering a periphery of the conductive layer 38. With respect to the supporting column 26, the supporting beams 28 and 30, and the tilting plate 32, the conductive layers 38 are integrally formed seamless, and the conductive layers 38 are maintained to have a substantially equal potential. The conductive layers 38 are made of a polysilicon having conductivity. The insulating film 40 is made of a silicon oxide. The conductive layer 38 is conductively connected to the relay electrode 18a of the substrate 12. A movable electrode 34a is constituted by the conductive layer 38 of the movable electrode portion 34 of the tilting plate 32. A movable electrode 36a is constituted by the conductive layer 38 of the movable electrode portion 36 of the tilting plate 32.

The mirror structure 16 includes a mirror supporting column 42 and a mirror 44. The mirror supporting column 42 is extended from the tilting plate 32 upwards. The mirror 44 is supported by the mirror supporting column 42. If the tilting plate 32 is tilted, the mirror 44 is tilted integrally with the tilting plate 32. As illustrated in FIG. 1, the mirror 44 is formed in a shape of a rectangular plate having a size covering the mirror supporting column 42, the movable structure 14, the relay electrode portion 18, the fixed electrode portions 20 and 22, and the like.

The optical deflection device 10 is of an electrostatic driving type and is configured to tilt the tilting plate 32 around the tilting axis X by controlling a voltage applied to the movable electrode terminal 18b and the fixed electrode terminals 20b and 22b, so that the mirror 44 is tilted. The driving voltage applied to the movable electrode terminal 18b and the fixed electrode terminals 20b and 22b can be controlled by connecting the movable electrode terminal 18b and the fixed electrode terminals 20b and 22b to a driving signal generator (not shown) or the like.

For example, the movable electrode terminal 18b conductively connected to the movable electrodes 34a and 36a is grounded, and the fixed electrode terminals 20b and 22b conductively connected to the fixed electrodes 20a and 22a are connected to the driving signal generator (not shown). If a driving voltage is applied to the fixed electrode terminal 20b by using the driving signal generator, an electrostatic attractive force is generated between the grounded movable electrode 34a and the fixed electrode 20a, so that the tilting plate 32 is tilted in the direction where the movable electrode portion 34 approaches the substrate 12. On the contrary, if a driving voltage is applied to the fixed electrode terminal 22b, an electrostatic attractive force is generated between the grounded movable electrode 36a and the fixed electrode 22a, so that the tilting plate 32 is tilted in the direction where the movable electrode portion 36 approaches the substrate 12. Therefore, it is possible to tilt the tilting plate 32 around the tilting axis X. The tilting plate 32 is tilted, so that the mirror 44 fixed through the mirror supporting column 42 to the tilting plate 32 is also tilted.

As illustrated in FIGS. 1 and 2, a rib 46 is formed on the tilting plate 32. As well illustrated in FIG. 5, in the optical deflection device 10 according to the embodiment, the rib 46 is formed by curving a portion of the tilting plate 32, of which plate thickness is substantially uniform, in a wavelike shape in the plate thickness direction. Since the rib 46 is formed, a stiffness of the tilting plate 32 is secured, and the warpage of the tilting plate 32 is suppressed.

Figure 5:
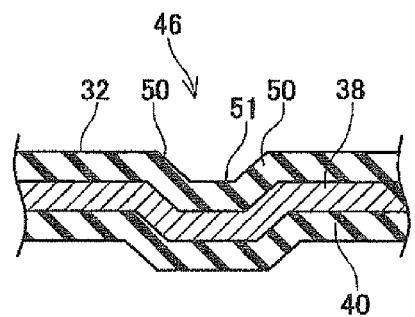
FIG. 5 is an enlarged cross-sectional diagram of a D portion of the optical deflection device 10 of FIG. 2.
Figure 6:
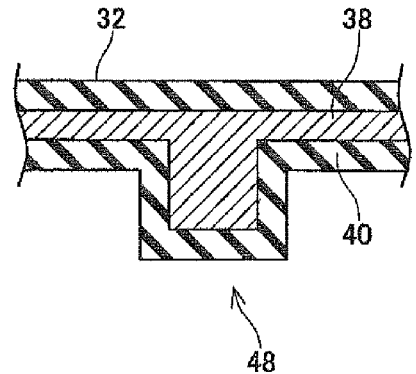
FIG. 6 is a cross-sectional diagram in a case where a rib 48 in which inner portion is buried is formed on a tilting plate 32.

In the optical deflection device 10 according to the embodiment, the rib 46 formed on the tilting plate 32 does not have a shape where the inner portion is buried similarly to a rib 48 illustrated in FIG. 6, but the rib 46 has a shape where the inner portion is not buried as illustrated in FIG. 5. If the rib 48 where the inner portion is buried as illustrated in FIG. 6 is formed on the tilting plate 32, the plate thickness is greatly different between the site where the rib 48 is formed and the site where the rib 48 is not formed. Therefore, due to unbalance of remaining stress in the plate thickness direction, warpage occurs in the tilting plate 32. However, since the rib 46 where the inner portion is not buried as illustrated in FIG. 5 is formed on the tilting plate 32, the plate thickness is substantially equal between the site where the rib 46 is formed and the site where the rib 46 is not formed. Therefore, the warpage of the tilting plate 32 caused by unbalance of the remaining stress in the plate thickness direction can be suppressed.

In addition, if the rib 48 illustrated in FIG. 6 is formed on the tilting plate 32, the tilting plate 32 is tilted, so that the rib 48 may collide with the substrate 12. In this case, there is a problem in that stress is concentrated on the base of the rib 48, so that the rib 48 may be easily damaged. However, if the rib 46 illustrated in FIG. 5 is formed on the tilting plate 32, although the tilting plate 32 is tilted, so that the rib 46 may collide with the substrate 12, stress is not easily concentrated, and the rib 46 is not easily damaged. It is possible to further improve reliability of the optical deflection device 10.

In addition, the rib 46 illustrated in FIG. 5 has functions of absorbing deformation of the rib 46 against a force of deforming the tilting plate 32 and maintaining the tilting plate 32 in an overall planar shape. Since the rib 46 illustrated in FIG. 5 is formed, it is possible to effectively suppress occurrence of the warpage of the tilting plate 32.

Figure 7:
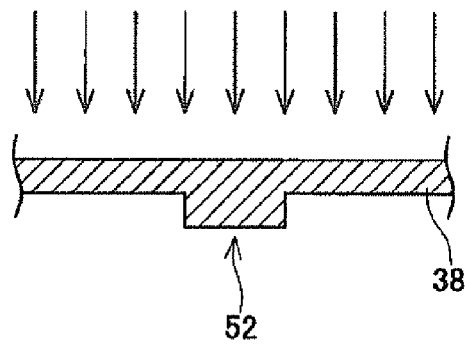
FIG. 7 is a diagram illustrating a situation where ion injection is performed on a rib 52 in which inner portion is buried.
Figure 8:
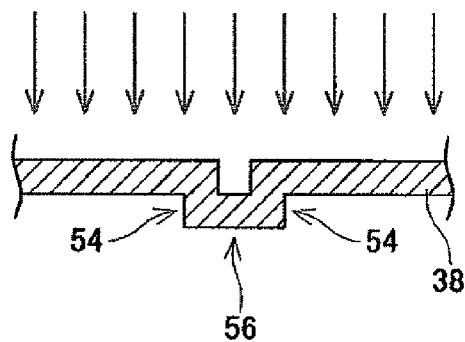
FIG. 8 is a diagram illustrating a situation where ion injection is performed on a rib 56 where a vertical portion 54 is formed on a side wall thereof.
Figure 9:
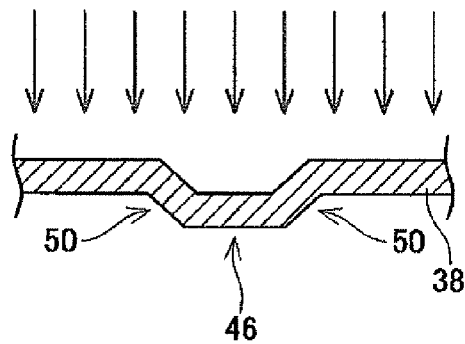
FIG. 9 is a diagram illustrating a situation where ion injection is performed on a rib 46 where a inclined portion 50 is formed on a side wall thereof.

As illustrated in FIG. 5, in the optical deflection device 10 according to the embodiment, the rib 46 includes a inclined portion 50 which is disposed on a side wall of the rib 46 and a bottom portion 51 of which periphery is surrounded by the inclined portion 50. An inclination angle of the inclined portion 50 is preferably in a range from 30° to 89°, more preferably, in a range from 45° to 89°. As illustrated in FIG. 7, in the case where a rib 52 of which inner portion is buried is formed, when the conductive layer 38 is formed by performing ion injection on a polysilicon of the tilting plate 32 so as to have conductivity, since the thickness is different between the site where the rib 52 is formed and the site where the rib 52 is not formed, it is difficult to uniformly inject impurities in the plate thickness direction. In addition, as illustrated in FIG. 8, in the case where a rib 56 where a vertical portion 54 is disposed on the side wall thereof is formed, when ion injection is performed on the polysilicon of the tilting plate 32 so as to have conductivity, impurities are not injected into a lower portion of the vertical portion 54, and it is thereby difficult to allow the polysilicon to have uniform conductivity, resulted in increased deformation and warpage. However, as illustrated in FIG. 9, in the case where the rib 46 where the inclined portion 50 is disposed on the side wall thereof is formed, when ion injection is performed on the polysilicon of the tilting plate 32 so as to have conductivity, it is easy to uniformly inject ions into the inclined portion 50. It is possible to appropriately allow the conductive layer 38 in an inner portion of the tilting plate 32 to have conductivity.

Hereinafter, a method of manufacturing the optical deflection device 10 according to the embodiment will be described with reference to FIGS. 10 to 14. FIGS. 10 to 14 correspond to the cross section in FIG. 2.

Figure 10:
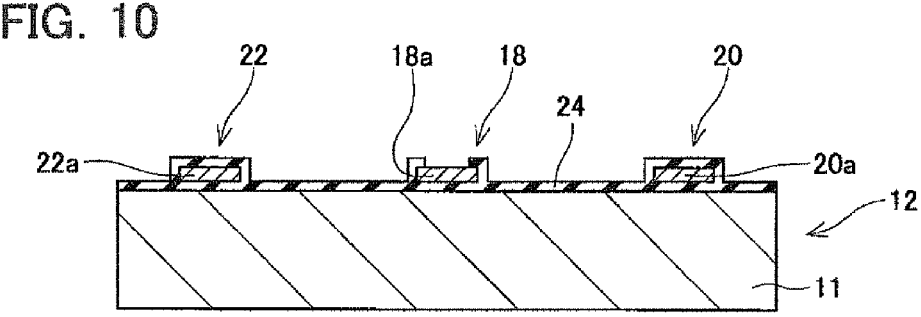
FIG. 10 is a diagram illustrating a process of manufacturing the optical deflection device 10.

First, as illustrated in FIG. 10, the insulating film 24 is formed by oxidizing the upper surface of the silicon wafer 11, and after a polysilicon layer is laminated thereon, the polysilicon layer is patterned by etching. Next, the polysilicon layer is allowed to have conductivity by using ion injection and activation annealing. Therefore, the relay electrode 18a and the fixed electrodes 20a and 22a of the substrate 12 are formed. Next, after the insulating film 24 is formed by oxidizing the surface of the polysilicon layer, the site in the insulating film 24, which corresponds to the supporting column 26, is removed by using etching. Therefore, the relay electrode portion 18 and the fixed electrode portions 20 and 22 of the substrate 12 are formed.

Figure 11:
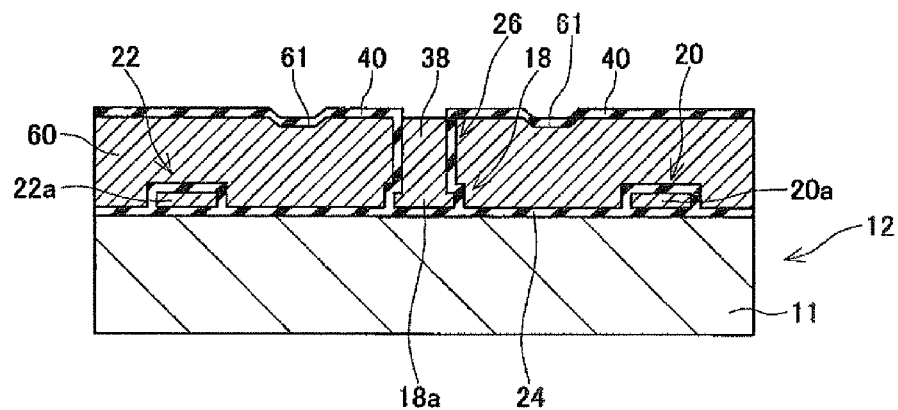
FIG. 11 is a diagram illustrating a process of manufacturing the optical deflection device 10.

Next, as illustrated in FIG. 11, a first sacrificial layer 60 is formed by laminating a polysilicon layer, a recess 61 corresponding to the rib 46 of the tilting plate 32 is formed on an upper surface of the first sacrificial layer 60 by using etching. Next, in order to allow the polysilicon layer at the site corresponding to the supporting column 26 to have conductivity, ion injection and activation annealing are performed. Next, the site corresponding to the outer periphery of the supporting column 26 is trimmed by using etching. Next, after the insulating film 40 is formed by oxidizing the surface of the first sacrificial layer 60, the site in the insulating film 40, which corresponds to the upper end of the supporting column 26, is removed by using etching.

Figure 12:
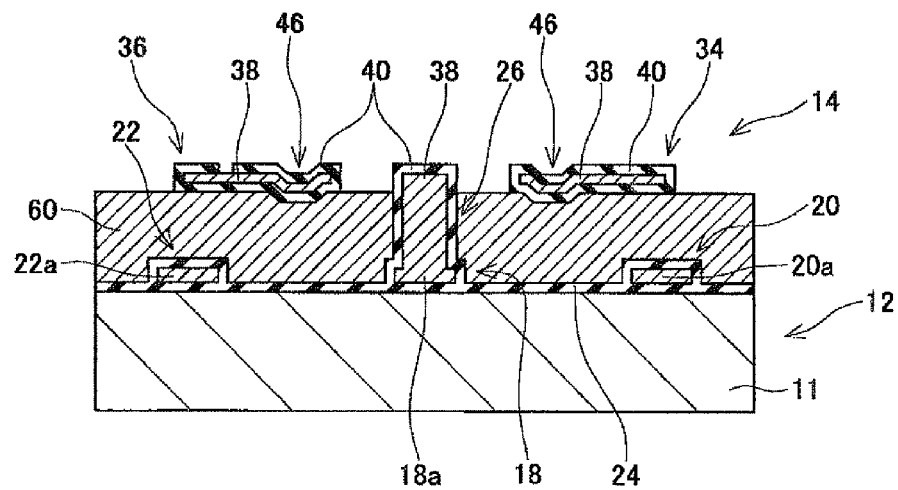
FIG. 12 is a diagram illustrating a process of manufacturing the optical deflection device 10.

Next, as illustrated in FIG. 12, a polysilicon layer is laminated on the upper surface of the insulating film 40, and the polysilicon layer is patterned by using etching. Next, the conductive layer 38 is formed by allowing the polysilicon layer to have conductivity by using ion injection and activation annealing. Next, the insulating film 40 is formed by oxidizing the surface of the conductive layer 38, and the insulating film 40 is patterned by using etching. Therefore, the supporting column 26, the supporting beams 28 and 30, and the tilting plate 32 are formed. In addition, in the embodiment, in order to conductively connect the mirror supporting column 42, which is to be formed later, to the conductive layer 38, during the etching of the insulating film 40 described above, the insulating film 40 from the site where the mirror supporting column 42 is to be formed is removed. In the case where the mirror supporting column 42 and the conductive layer 38 are configured not to be conductively connected to each other, there is no need to remove the insulating film 40 from the site where the mirror supporting column 42 is to be formed.

Figure 13:
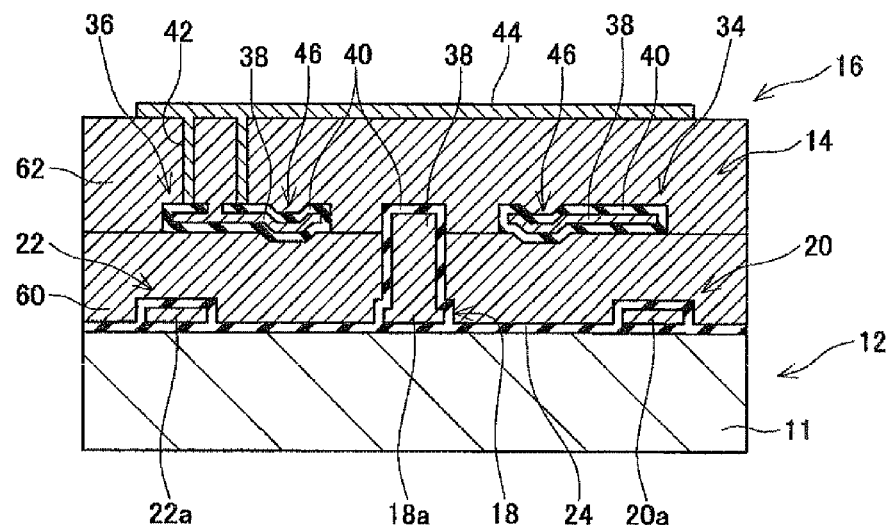
FIG. 13 is a diagram illustrating a process of manufacturing the optical deflection device 10.

Next, as illustrated in FIG. 13, a second sacrificial layer 62 is formed by laminating a polysilicon layer. Next, after the polysilicon layer is allowed to have conductivity by using ion injection and activation annealing, the site corresponding to the outer periphery of the mirror supporting column 42 is trimmed by using etching. Next, a metal layer is laminated by using a sputtering method, and the metal layer is patterned by using etching. In the embodiment, the metal layer is made of aluminum. Therefore, the mirror supporting column 42 and the mirror 44 are formed.

Figure 14:
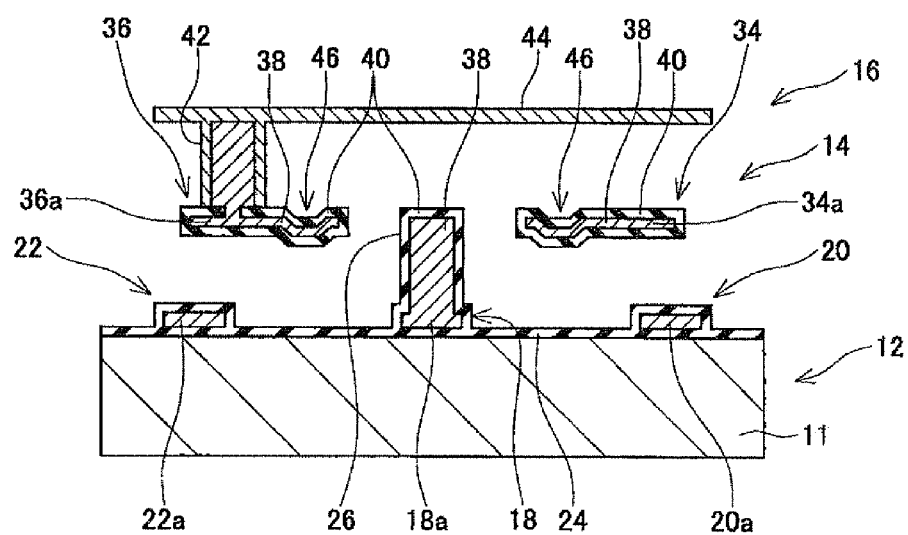
FIG. 14 is a diagram illustrating a process of manufacturing the optical deflection device 10.

Next, as illustrated in FIG. 14, the first sacrificial layer 60 and the second sacrificial layer 62 are removed by using etching. Next, the insulating films 24 from the sites corresponding to the movable electrode terminal 18b and the fixed electrode terminals 20b and 22b are removed by using etching, and the movable electrode terminal 18b and the fixed electrode terminals 20b and 22b are formed by using a sputtering method and etching. In this manner, it is possible to manufacture the optical deflection device 10 illustrated in FIGS. 1 to 4.

Figure 15:
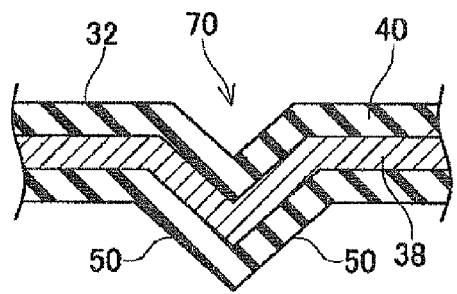
FIG. 15 is a cross-sectional diagram in a case where a rib 70 having no bottom portion 51 is formed on a tilting plate 32 in the optical deflection device 10.

In the aforementioned embodiment, as illustrated in FIG. 5, a case is described where the rib 46 including the inclined portion 50 and the bottom portion 51 is formed on the tilting plate 32. However, for example, as illustrated in FIG. 15, a rib 70 having a V-shaped cross section and including only the inclined portion 50 without the bottom portion 51 may be formed on the tilting plate 32.

Figure 16:
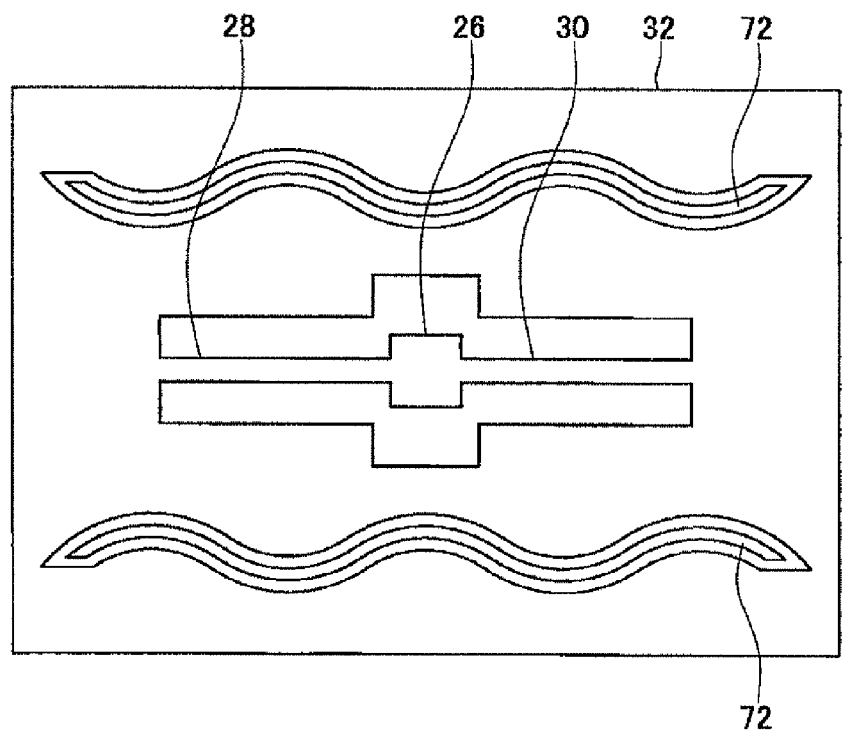
FIG. 16 is a diagram illustrating an upper surface of the tilting plate 32 of a modified example of the optical deflection device 10.
Figure 17:
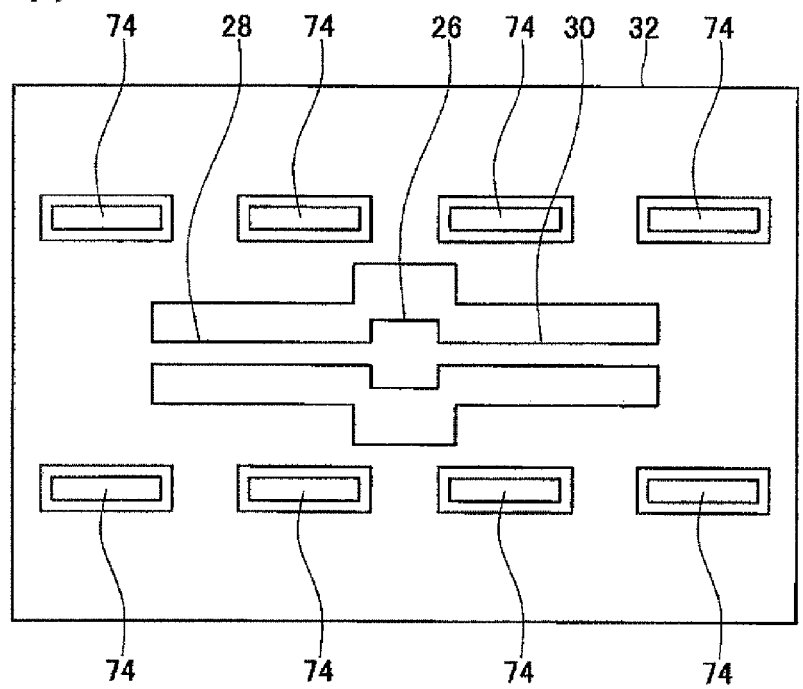
FIG. 17 is a diagram illustrating an upper surface of the tilting plate 32 of a modified example of the optical deflection device 10.
Figure 18:
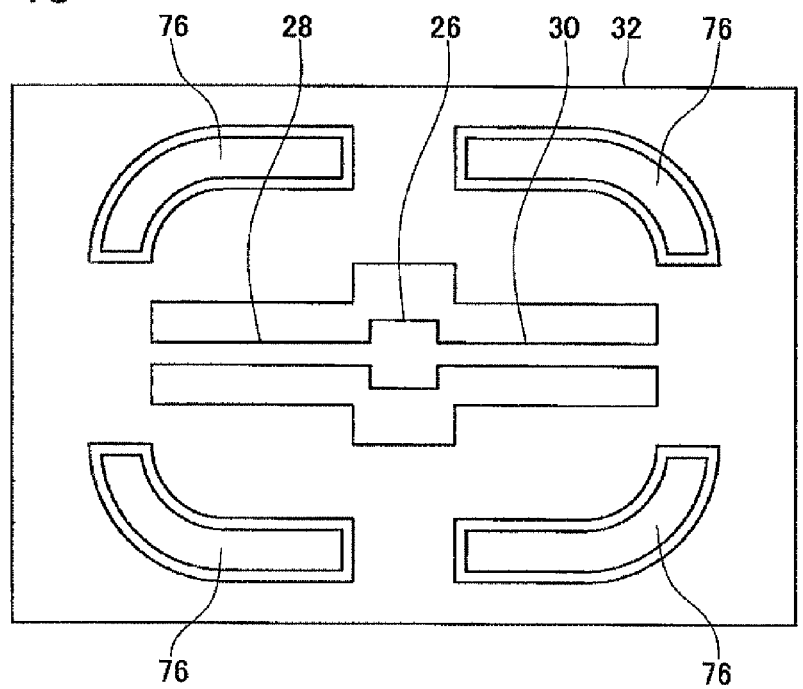
FIG. 18 is a diagram illustrating an upper surface of the tilting plate 32 of a modified example of the optical deflection device 10.

In the aforementioned embodiment, as illustrated in FIG. 3, a case is described where the rib 46 having a shape of a straight line is formed on the tilting plate 32 as the tilting plate 32 is seen in a plan view. However, for example, as illustrated in FIG. 16, a rib 72 having a shape of a wavelike curve as the tilting plate 32 is seen in a plan view may be formed. Alternatively, as illustrated in FIG. 17, a rib 74 having a shape of a broken line may be formed as the tilting plate 32 is seen in a plan view. Otherwise, as illustrated in FIG. 18, a rib 76 of which area is widened as the tilting plate 32 is seen in a plan view may be formed.

Figure 19:
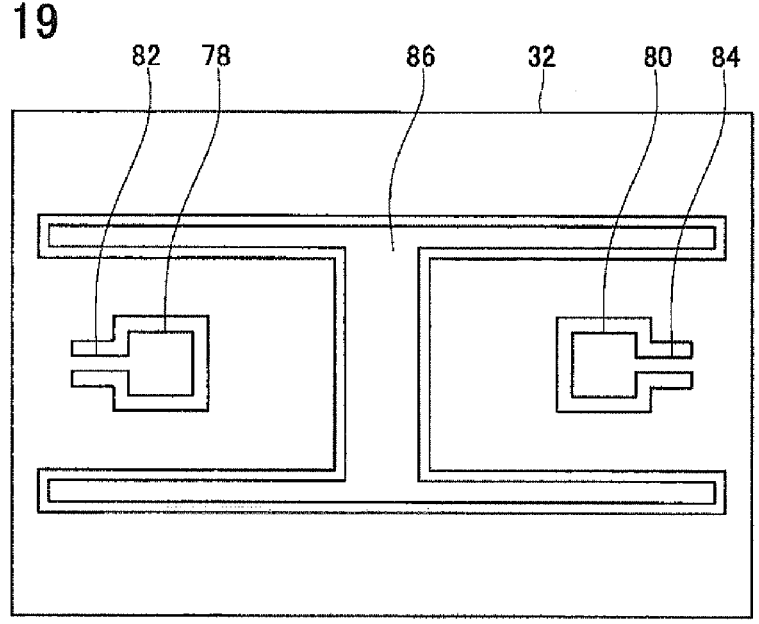
FIG. 19 is a diagram illustrating an upper surface of the tilting plate 32 of a modified example of the optical deflection device 10.
Figure 20:
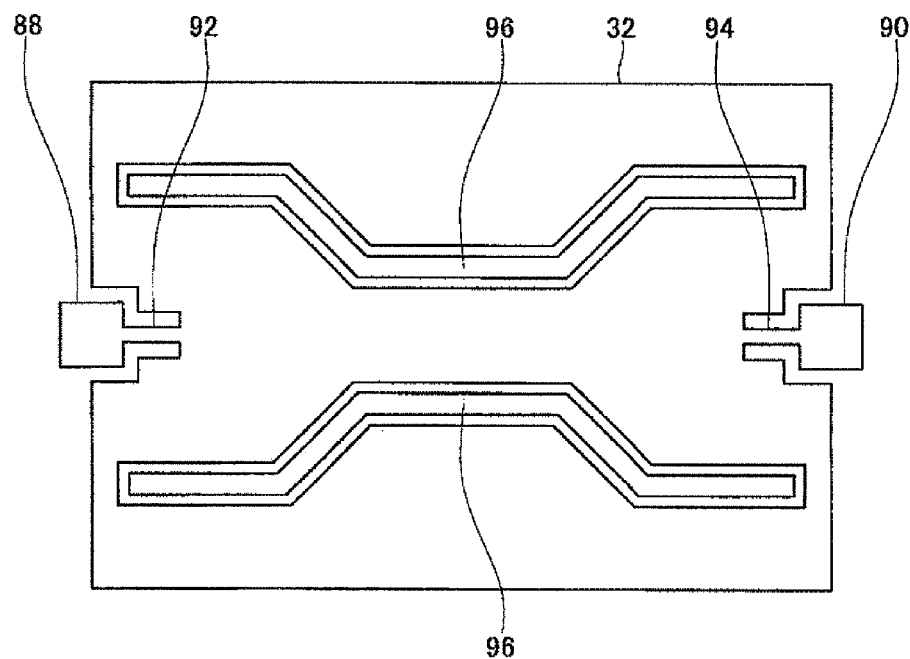
FIG. 20 is a diagram illustrating an upper surface of the tilting plate 32 of a modified example of the optical deflection device 10.

In addition, in the aforementioned embodiment, as illustrated in FIG. 3, a configuration is described where the tilting plate 32 has an opening at the center thereof and the tilting plate 32 is supported by the supporting column 26, which is extended from the substrate 12 to the opening, and the supporting beams 28 and 30. As an alternative configuration, for example, as illustrated in FIG. 19, the tilting plate 32 may have a pair of openings; the tilting plate 32 may be supported by a pair of supporting columns 78 and 80 which is extended from the substrate to the openings, and a pair of supporting beams 82 and 84 which is extended from the supporting columns 78 and 80; ad a rib 86 may be formed on the tilting plate 32. As another alternative configuration, as illustrated in FIG. 20, the tilting plate 32 may be supported by a pair of supporting columns 88 and 90 which is disposed at an outer side of the tilting plate 32 and a pair of supporting beams 92 and 94 which is extended from the supporting columns 88 and 90, and a rib 96 may be formed on the tilting plate 32.

In addition, a shape of a rib formed on the tilting plate 32 may be determined by using a structure optimization method. Hereinafter, a technique of determining a shape of a rib of the tilting plate 32 will be described, the determination is made by using a level set method which is a kind of the structure optimization method so that an amount of deformation due to internal stress of the tilting plate 32 is minimized.

In a semiconductor manufacturing process, a rib having three-dimensional shape is formed by transferring the shape by using two-dimensional photomask. Therefore, in the embodiment, two-dimensional photomask shape is determined by using the structure optimization method. In the embodiment, in the tilting plate 32, the two-dimensional photomask area capable of forming a rib is defined as a design area D. In the design area D, an area where there is no rib is denoted by $\Omega$, and an area where a rib is to be formed is defined as a complementary area of $\Omega$. In addition, a level set function $\phi(x)$ is introduced as follows.

$$\phi(x) > 0 \text{ for } \forall x \in \Omega \setminus (\partial\Omega \setminus \partial D)$$

$$\phi(x) = 0 \text{ for } \forall x \in \partial\Omega \setminus \partial D$$

$$\phi(x) < 0 \text{ for } \forall x \in D \setminus \Omega \quad \text{[Equation 1]}$$

Herein, x denotes a coordinate in the design area D, $\partial\Omega$ denotes a boundary of $\Omega$, and $\partial D$ is a boundary of the D. An arbitrary rib shape in the design area D can be expressed by using the level set function $\phi$. In addition, it is possible to obtain a highly-accurate calculation result by using a signed distance function with respect to a zero equivalent surface $\{x|\phi(x)=0\}$ as the level set function.

In order to obtain an optimized shape of a rib, a virtual time t is introduced, and the level set function $\phi$ is repetitively updated by using a level set equation expressed as follows.

$$\frac{\partial \phi(x, t)}{\partial t} + V_N(x, t)|\nabla \phi(x, t)| = 0 \quad \text{[Equation 2]}$$

Herein, $V_N(x, t)$ is a normal direction velocity which is determined based on sensitivity analysis or the like. By allowing the above-described level set equation to be discretized by using an explicit method, the following equation is obtained.

$$\frac{\phi(x, t + \Delta t) - \phi(x, t)}{\Delta t} + V_N(x, t)|\nabla \phi(x, t)| = 0 \quad \text{[Equation 3]}$$

Herein, $\Delta t$ is a time increment. Re-initialization is performed on the before-updating level set function $\phi(x, t)$ so as to be a signed distance function, so that $|\phi(x, t)|=1$ is satisfied. Therefore, a simplified level set equation is obtained as follows.

$$\frac{\phi(x, t + \Delta t) - \phi(x, t)}{\Delta t} + V_N(x, t) = 0 \quad \text{[Equation 4]}$$

The normal direction velocity $V_N(x, t)$ is calculated in the state where $\phi(x, t)$ is re-initialized to be the signed distance function, the after-updating level set function $\phi(x, t+\Delta t)$ is obtained based on the above equation. This calculation is iteratively performed, so that the level set function $\phi$ for implementing an optimized shape of a rib is obtained.

Next, the calculation of the normal direction velocity $V_N(x, t)$ will be described. The problem for minimizing an amount of deformation of the tilting plate 32 may be formulated as the problem for minimizing an objective functional $F(\phi)$ as follows.

$$F(\phi) = \int_D u \cdot u \, d\Omega \quad \text{[Equation 5]}$$

Herein, u is a projection of a displacement field on the upper surface of the tilting plate 32, which has a rib formed by two-dimensional photomask expressed by the level set function $\phi$, onto the design area D.

Figure 21:
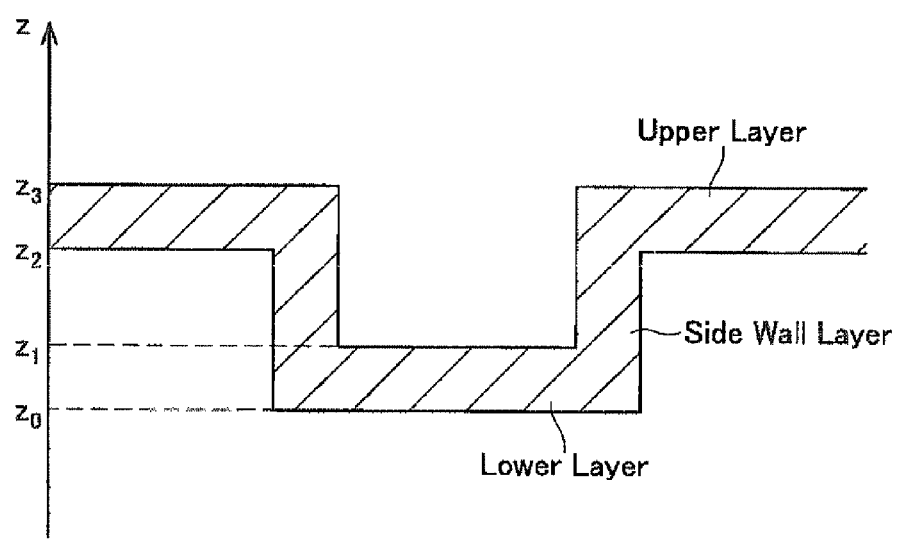
FIG. 21 is a cross-sectional diagram illustrating a relation among an upper layer, a lower layer, and a side wall layer of the tilting plate 32 when a shape of a rib is determined by using a structure optimization method.

As illustrated in FIG. 21, the tilting plate 32 having a rib may be recognized as a three-layer structure of an upper layer (hereinafter, indicated by subscript U), a lower layer (hereinafter, indicated by subscript L) and a side wall layer (hereinafter, indicated by subscript W). Herein, density functions $\rho_U$, $\rho_L$, and $\rho_W$ of the layers determined from the level set function $\phi(x)$ which is initialized to be the signed distance function as follows.

$$\rho_U = \begin{cases} 0 & \text{for } \phi(x) + h/2 < 0 \\ 1 & \text{for } \phi(x) + h/2 \geq 0 \end{cases} \quad \text{[Equation 6]}$$

$$\rho_L = \begin{cases} 0 & \text{for } \phi(x) - h/2 < 0 \\ 1 & \text{for } \phi(x) - h/2 \geq 0 \end{cases}$$

$$\rho_W = \rho_U \rho_L$$

In addition, moduli of elasticity $E_i$ (i=U, R, W) of the layers may be determined as follows when a modulus of elasticity of the tilting plate 32 is denoted by E.

$$E_i = E \rho_i \quad \text{[Equation 7]}$$

In addition, the internal stresses $\sigma_i$ (i=U, R, W) of the layers are given as a linear stress distribution in the thickness direction as follows.

$$\sigma_i = \sigma \left( \frac{z - z_B}{z_T - z_B} \right) \rho_i \quad \text{[Equation 8]}$$

Herein, z indicates a thickness direction coordinate. As illustrated in FIG. 21, coordinates of boundaries of the layers are denoted by $z_0$, $z_1$, $z_2$, and $z_3$, $z_T$ and $z_B$ in the above equation are expressed as follows.

$$z_T = \begin{cases} z_1 & \text{for } \phi(x) + h/2 < 0 \\ z_3 & \text{for } \phi(x) + h/2 \geq 0 \end{cases} \quad \text{[Equation 9]}$$

$$z_B = \begin{cases} z_0 & \text{for } \phi(x) - h/2 < 0 \\ z_2 & \text{for } \phi(x) - h/2 \geq 0 \end{cases}$$

If the densities, moduli of elasticity, and internal stresses of the layers are determined as described above, the displacement field of the upper surface of the tilting plate 32 may be determined according to an analysis using a finite element model.

More specifically, the level set function and the displacement field are allowed to be discretized for each nodes by using a finite element mesh which is not changed during the optimization process. With respect to the level set function for each node, the level set equation is expressed by the following equation.

$$\Phi^{t+\Delta t} = \Phi^t - \Delta t V_N^t \quad \text{[Equation 10]}$$

Herein, $\phi^t$ is a vector formed of the level set function of each node at a time point t, and $V_N^t$ is a vector formed of the normal direction velocity of each node at a time point t. Since a discretization using an explicit method is performed in the above technique, the time increment $\Delta t$ needs to be determined as follows so that the CFL condition is satisfied. Herein, Δx is a distance between adjacent nodes.

$$\Delta t = \frac{\alpha \Delta x}{\|V_N^t\|_\infty}, \alpha \le 1 \qquad \text{[Equation 11]}$$

The simplest method of providing $V_N^t$ is a method where $V_N^t$ is set as a discrete system sensitivity of the objective functional $F(\phi)$. In this case, $V_N^t$ is expressed as follows.

$$V_N^t = \left.\frac{dF(\phi)}{d\phi}\right|_t \qquad \text{[Equation 12]}$$

Herein, $F(\phi)$ is an objective functional which is approximated by using the discretized level set function and displacement field, and $d/d\phi|_t$ represents a discrete system sensitivity at a time point t.

In the embodiment, $V_N^t$ is provided by taking into consideration a discrete system sensitivity of a perimeter corresponding to a circumference length of a rib so that an optimized solution of an excessively complicated rib shape is not formed. Herein, the perimeter $P(\phi)$ is defined as follows.

$$P(\phi) = \int_D \delta(\phi(x)) |\nabla \phi(x)| d\Omega \qquad \text{[Equation 13]}$$

Herein, δ is Dirac's delta function. In the case where the aforementioned perimeter P and objective functional F have small values, $V_N^t$ is expressed as follows.

$$V_N^t = w \left.\frac{dF(\phi)}{d\phi}\right|_t + (1-w) \frac{\left\|\left.\frac{dF(\phi)}{d\phi}\right|_t\right\|_\infty}{\left\|\left.\frac{dP(\phi)}{d\phi}\right|_t\right\|_\infty} \left(\left.\frac{dP(\phi)}{d\phi}\right|_t\right) \qquad \text{[Equation 14]}$$

Herein, w is a weighting parameter, and $P(\phi)$ is a perimeter which is approximated by using the discretized level set function.

Figure 22:
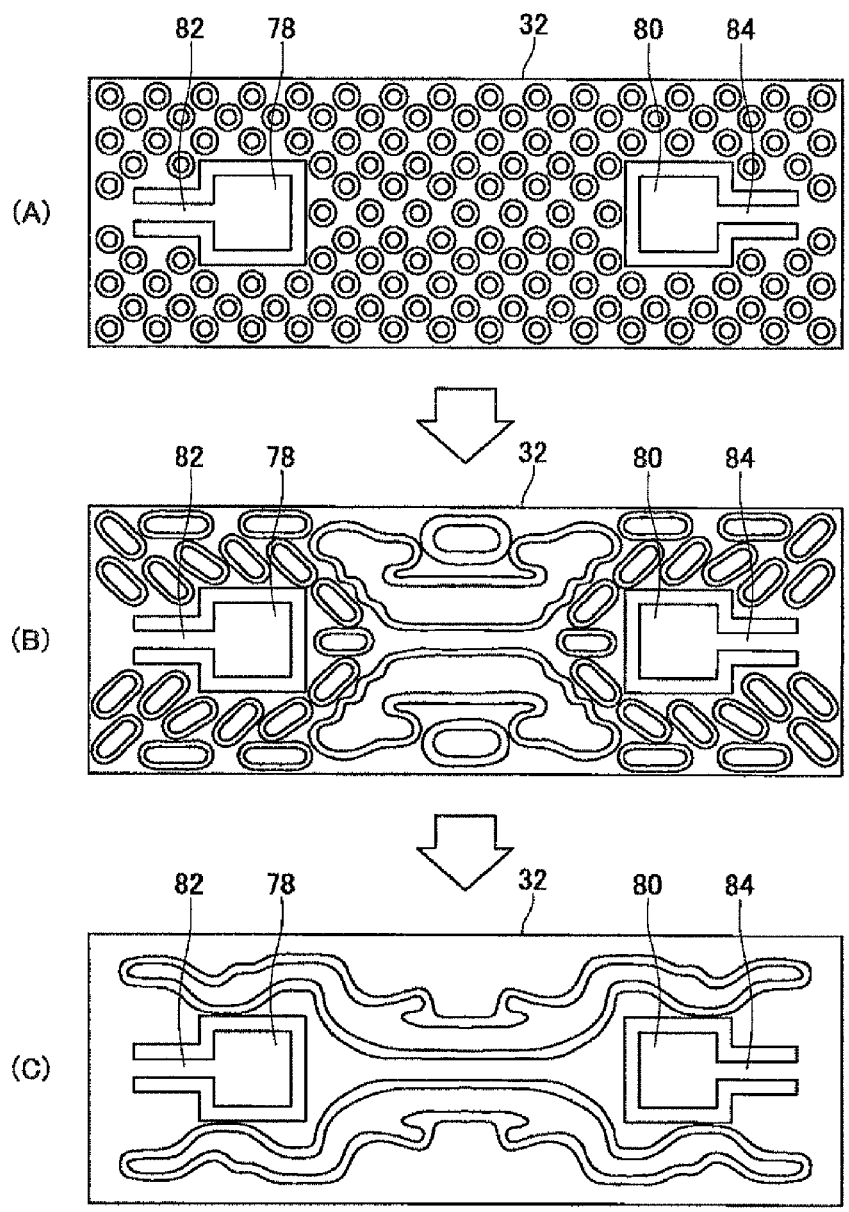
FIG. 22 illustrates a case where a dot array shape is used as an initial shape of a rib and the shape of the rib of the tilting plate 32 is determined by using a structure optimization method.
Figure 23:
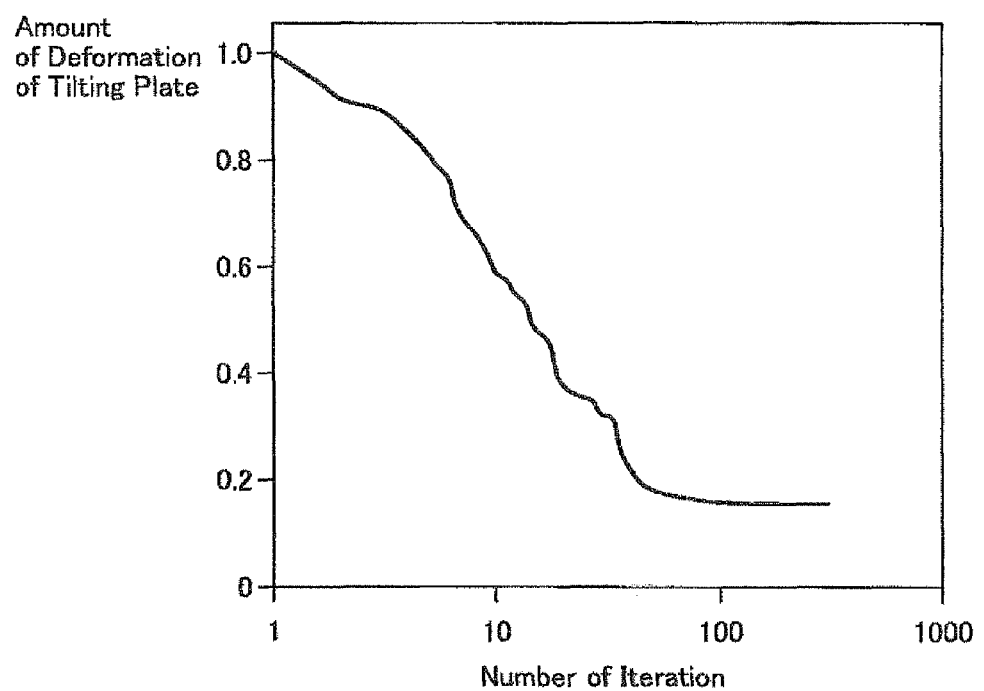
FIG. 23 illustrates a relation between the number of iterations and an amount of deformation of the tilting plate 32 in the structure optimization method of FIG. 22.

In FIGS. 22A, 22B, and 22C illustrate the case where a dot array shape is used as an initial shape of a rib and the shape of the rib is changed according to progression of iterative calculation during the optimization of the shape of the rib using the aforementioned method. FIG. 23 illustrates a relationship between the number of iteration and the amount of deformation of the tilting plate 32 in the structure optimization method of FIG. 22. In FIG. 23, the amount of deformation of the tilting plate 32 is normalized. As illustrated in FIG. 23, the shape of the rib of the tilting plate 32 of which amount of deformation with respect to the internal stress is very small may be determined by performing iteration.

Figure 24:
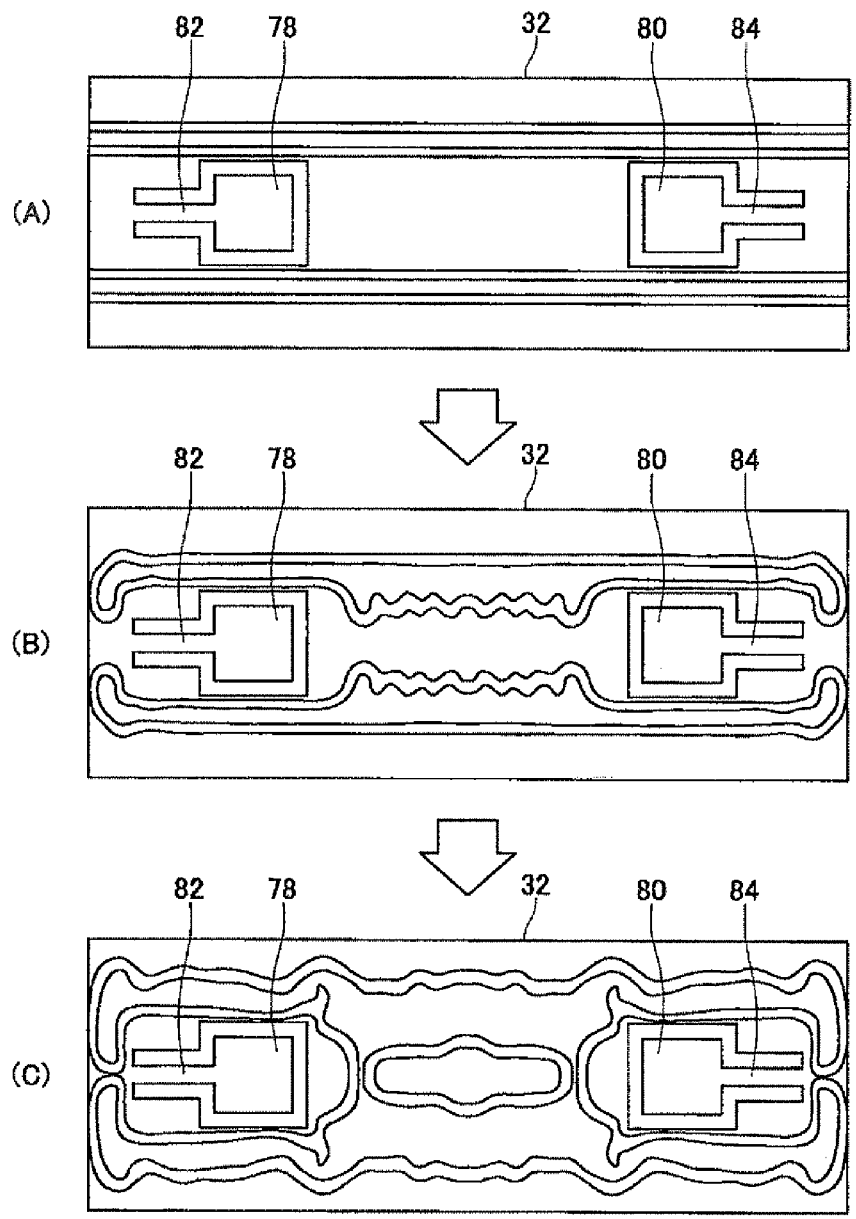
FIG. 24 illustrates a case where a line shape is used as an initial shape of a rib and the shape of the rib of the tilting plate 32 is determined by using a structure optimization method.
Figure 25:
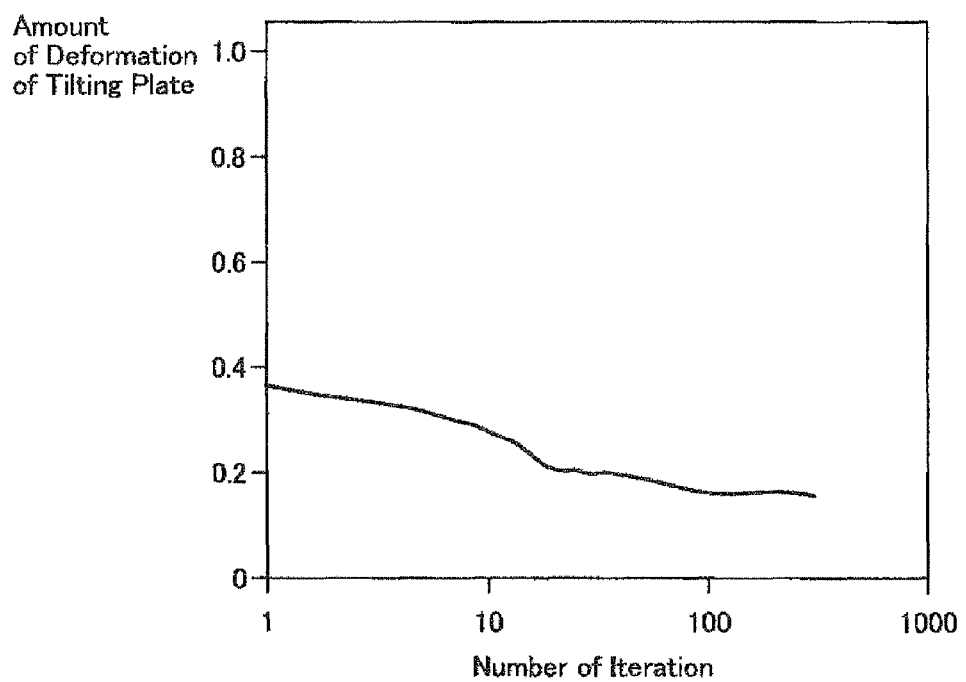
FIG. 25 illustrates a relation between the number of iterations and an amount of deformation of the tilting plate 32 in the structure optimization method of FIG. 24.

In FIGS. 24A, 24B, and 24C illustrate the case where a line shape is used as an initial shape of a rib and the shape of the rib is changed according to progression of iterative calculation during the optimization of the shape of the rib using the aforementioned method. FIG. 25 illustrates a relationship between the number of iteration and the amount of deformation of the tilting plate 32 in the structure optimization method of FIG. 24. In FIG. 25, similarly to FIG. 23, the amount of deformation of the tilting plate 32 is normalized. As illustrated in FIG. 25, the shape of the rib of the tilting plate 32 of which amount of deformation with respect to the internal stress is very small may be determined by performing iteration.

The representative and non-limiting specific embodiments of the present invention are described above in detail with reference to the drawings. The detailed description provided above is simply intended to provide those skilled in the art with the detail for implementing preferred examples of the present invention and is not intended to limit the scope of the present invention. Additional characteristics and inventions disclosed herein can be used independently of, or along with, other characteristics and inventions in order to provide a further improved semiconductor device.

The combinations of the characteristics and steps disclosed in the detailed description above are not essential for implementing the present invention in the broadest sense and are merely provided in order to explain particularly the representative specific embodiments of the present invention. In addition, various characteristics of the representative specific embodiments described above and various characteristics described in the independent and dependent claims do not have to be combined in accordance with the embodiments described herein or in any particular order when providing additional and useful embodiments of the present invention.

All the characteristics described in the present description and/or the claims are intended to be disclosed separately and independently from each other for the purpose of original disclosure, as well as for the purpose of restricting the claimed subject matters independent of the compositions of the characteristics described in the embodiments and/or the claims. In addition, all value ranges or indications of groups of entities are intended to disclose every possible intermediate value or intermediate entity for the purpose of original disclosure, as well as for the purpose of restricting the claimed subject matters.

The embodiments of the present invention are described above in detail. However, these embodiments are merely illustrative and are not intended to limit the scope of patent claims. The technology described in the scope of patent claims includes various changes and modifications of the specific embodiments illustrated above. The technical elements exemplified in the present description or the drawings exert technical utility independently or in various combinations, and are not limited to the combinations of the claims described in the application originally filed. Further, the technology exemplified in the present description or the drawings simultaneously achieve a plurality of objects, and achieving one of the objects itself has technical utility.

What is claimed is:

1. A plate-shaped member formed by using a semiconductor process and having a planar expansion, comprising:
    a flat area substantially coplanar with a plane of the plate-shaped member; and
    a rib in a different position than the flat area in a direction normal to the plane,
    wherein the rib is recessed on one side and equally projecting on another side of the plate-shaped member.

2. The plate-shaped member according to claim 1, wherein the rib and the flat area are connected to each other through an inclined portion that is at an oblique angle to the plane.

3. The plate-shaped member according to claim 1, further comprising:
    a conductive layer and an insulating film which covers a periphery of the conductive layer.

4. The plate-shaped member according to claim 1, wherein shapes of the rib and flat area are determined by using a structure optimization method which minimizes an amount in deformation of the plate-shaped member with respect to internal stress.

5. A semiconductor device comprising:
a substrate; and
a tilting plate which is tiltable relatively to the substrate, including:
   a flat area substantially coplanar with a plane of the plate-shaped member; and
   a rib configured to relieve influence of remaining stress in a direction normal to the plane,
   wherein the rib is recessed on one side and equally projecting on another side of the tilting plate.

6. The semiconductor device according to claim 5, wherein an inclined portion that is at an oblique angle to the plane is formed on a side wall of the rib.

7. The semiconductor device according to claim 5, wherein the tilting plate includes a conductive layer and an insulating film which covers a periphery of the conductive layer.

8. The semiconductor device according to claim 5, further comprising a mirror which is fixed to the tilting plate.

9. The semiconductor device according to claim 5, wherein a shape of the rib of the tilting plate is determined by using a structure optimization method which minimizes an amount in deformation of the tilting plate with respect to internal stress.

10. A plate-shaped member formed by using a semiconductor process and having a planar expansion, comprising:
   a flat area substantially coplanar with a plane of the plate-shaped member; and
   a rib in a different position than the flat area in a direction normal to the plane,
   wherein the rib is recessed on one side and equally projecting on an other side of the plate-shaped member, and the rib and the flat area are connected to each other through an inclined portion that is at an oblique angle to the plane.

* * * * *